UNITED STATES PATENT OFFICE.

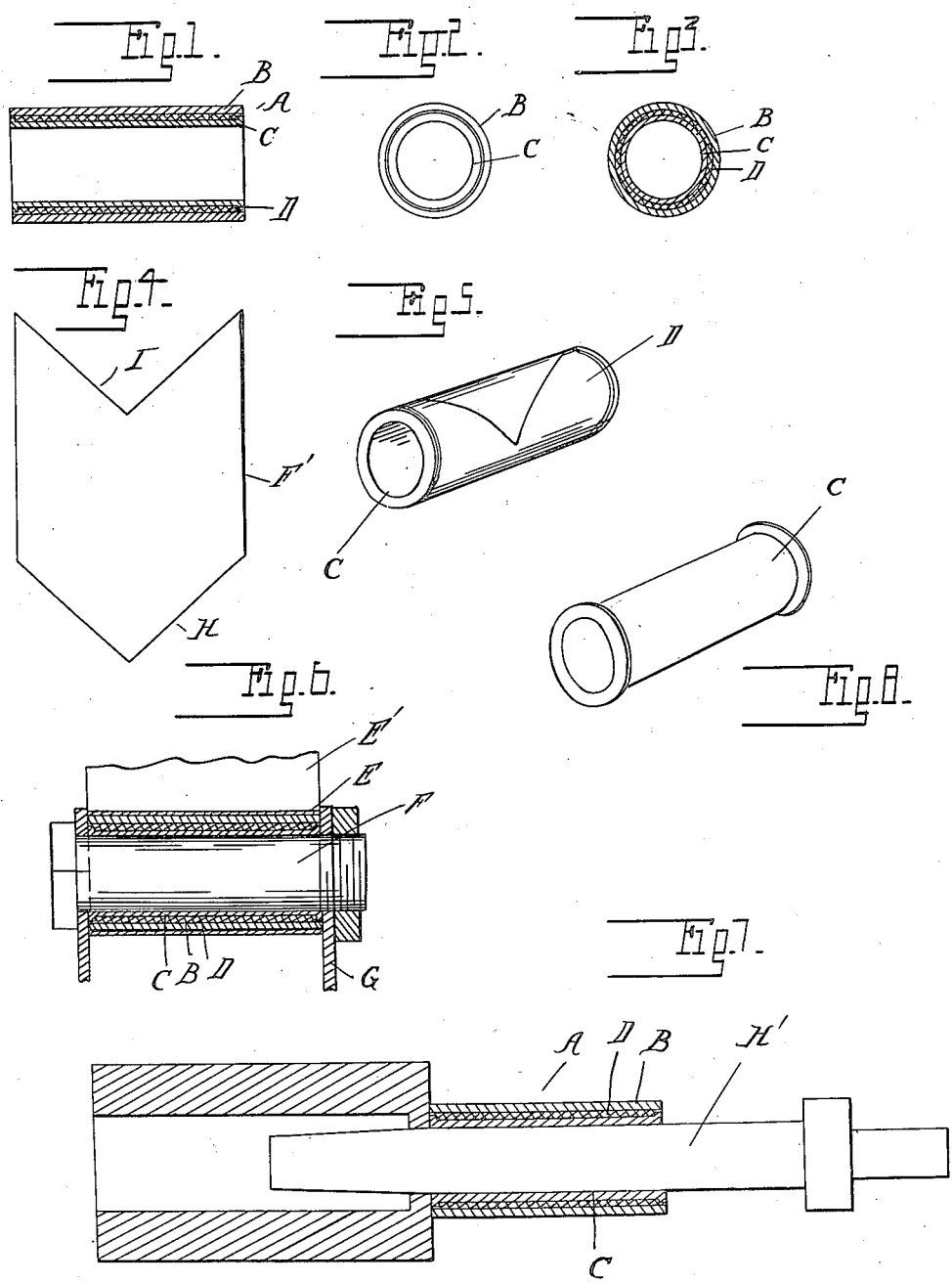

NORBERT L. OBRECHT, OF DETROIT, MICHIGAN, ASSIGNOR, BY DIRECT AND MESNE ASSIGNMENTS, TO O. AND S. BEARING COMPANY, OF DETROIT, MICHIGAN, A PARTNERSHIP COMPOSED OF HARRY SKILLMAN, NORBERT L. OBRECHT, AND NEWTON SKILLMAN.

BEARING.

1,117,226. Specification of Letters Patent. Patented Nov. 17, 1914.

Application filed April 10, 1913. Serial No. 760,256.

*To all whom it may concern:*

Be it known that I, NORBERT L. OBRECHT, a citizen of the United States of America, residing at Detroit, in the county of Wayne and State of Michigan, have invented certain new and useful Improvements in Bearings, of which the following is a specification, reference being had therein to the accompanying drawings.

My invention relates to bearings, and resides in the novel construction of the bearing and the method of making the same; in the novel lubricating fabric from which the bushing or bearing is made; and further in the method of forming the lubricating fabric.

In the drawings,—Figure 1 is a longitudinal, central section illustrating one form of my improved bearing; Fig. 2 is an end elevation thereof; Fig. 3 is a cross-section; Fig. 4 is a plan view of a strip of my improved lubricating fabric; Figs. 5, 6 and 7 illustrate certain steps in the formation of the bearing; and Fig. 8 is a perspective view of one of the bearing parts.

A designates a bearing embodying the invention, formed of sections B and C, positioned the one within the other for relative movement, and a lubricating bushing D arranged intermediate and compressed between the relatively movable sections. In forming the bearing the section C is made of a cross-section sufficiently less than that of the section B, to permit the inner to be readily arranged within the outer, with the lubricating material therebetween. The difference in cross-section of the two sections is then decreased so as to properly compress the lubricating material therebetween. One of the sections—preferably the inner—has the face in engagement with the outer, smooth or polished, so as to permit this section to freely turn in relation to the bushing. Preferably this lubricating material comprises a fibrous substance treated with a solid lubricant such as graphite—in contradistinction to a plastic or liquid lubricant. In treating the fabric I find it desirable to impregnate it with the solid lubricant by forming a mixture of finely powdered solid lubricant and a carrying agent which will carry the lubricant thoroughly into the fibrous substance; substantially, if not all of the carrying agent being afterward driven out of the fabric as by compressing the latter. Asbestos fabric having interwoven therein a sufficient quantity of fine wire to better maintain the shape of the fabric, has proven a very efficient fibrous material for such purposes. The asbestos is impregnated with graphite by placing the same in a mixture of oil, tallow and finely powdered graphite, having about the proportions of two of graphite, one of oil and one of tallow, the mixture being maintained at a temperature of about 300 degrees F. so as to increase the liquidity of the oil and tallow, to permit the same to carry the graphite thoroughly between the fibers of the asbestos. The length of time which the asbestos remains in the mixture depends of course, upon the thickness of the fibrous substance employed.

The specific type of bearing illustrated is designed for use with shackles of vehicle springs and is composed of metallic, cylindrical sleeves concentrically arranged for relative, oscillatory movement, the lubricating fabric being interposed between the sleeves. The outer sleeve, which is preferably of steel, has a driving fit with the eye E of the spring E', while the inner, concentric member is preferably of soft steel, brass, or the like, and is fixedly secured against rotation to the bolt F, which connects the bearing and the shackle G.' When the parts are assembled the lubricating fabric forms a bushing within which the brass sleeve oscillates.

As before stated, the method of making my improved bearing is also novel, and in order that this method may be better understood, the specific process used in constructing the embodiment of the invention shown in the drawing, will be described. The inner section is formed from a sleeve C—see Fig. 5—of a length slightly greater than the length of the outer sleeve and provided with integral, annular flanges at opposite ends, while the outer sleeve is of a size to permit the flange ends of the inner member to be inserted therethrough. The bushing is made from a strip F' of reinforced asbestos of the desired width, treated with a mixture of graphite, oil and tallow, as hereinbefore described, and cut into a length equal to the circumference of the inner sleeve before it is expanded. One end of the strip as H is tapered and the other end provided with a coöperating recess I so as to provide a better joint between the meeting ends of the fabric. The strip is then wrapped around the inner sleeve and sufficiently compressed thereabout so that it will remain in engagement therewith during the telescoping of the sleeves. After the parts are so assembled they are placed in a suitable machine and the inner sleeve expanded by driving a tapering mandrel H' therethrough, as shown in Fig. 6. During the expanding of the inner sleeve the fibrous material is compressed so that it is exceedingly hard, a pressure of about 10000 pounds being applied to the mandrel to force the same through the sleeve C, and during this compression the carrying agent is substantially, if not entirely, driven out of the fabric through the opening at the ends of the sleeves. The expansion of the brass sleeve contacts the same longitudinally and when the bearing is finished, the sleeves are of the same length, while the annular flanges are in exceedingly close proximity to, but slightly out of engagement with the inner face of the outer sleeve. These flanges form retainers for the bushing and also prevent dirt or the like from working its way in between the several parts. Since the inner face of the outer sleeve is unfinished, the fibrous material will adhere thereto sufficient to prevent rotation between the bushing and the outer sleeve. The brass sleeve, however, has the outer face thereof polished so that it will readily turn in the bushing. With the bushing heretofore described the compressed fabric tends to expand even after being highly compressed and, therefore, exerts an expansible pressure upon the inner and outer sections.

The method just described, while desirable, is of course, subject to various modifications without departing from the scope of my invention.

What I claim as my invention is:

1. The combination with relatively movable inner and outer members, of an annular bushing composed of an expansible fibrous substance impregnated with a lubricant arranged intermediate the relatively movable members, and radially compressed therebetween, whereby said bushing acts expansively against both members with substantially equal radial pressure throughout its length.

2. The combination with concentrically-arranged relatively movable metallic members, of a bushing comprising a reinforced expansible fabric impregnated with a lubricant arranged intermediate said members and radially compressed therebetween, whereby said bushing acts expansively against both members with substantially equal radial pressure throughout its length.

3. A bearing comprising relatively movable, concentrically-arranged, metallic sleeves, and a bushing composed of a fabric impregnated with a solid lubricant arranged intermediate said sleeves and compressed therebetween so as to act expansively against both members.

4. As a new article of manufacture, a bearing comprising inner and outer sleeves, a compressed, expansible, lubricating material therebetween and connecting the two sleeves together while permitting a relative, rotary movement between the two.

5. A bearing comprising inner and outer relatively movable members, the inner member being hollow, and a bushing of compressed, expansible, lubricating material interposed between the inner and outer members and exerting an expansible pressure upon said members.

6. A bearing comprising inner and outer relatively movable members, the inner member being hollow, and a bushing of fibrous substance impregnated with a solid lubrimant interposed between the inner and outer members and exerting an expansible pressure upon said members.

7. A bearing comprising inner and outer relatively movable members, the inner member being hollow, a bushing of fibrous substance impregnated with a solid lubricant interposed between the inner and outer members and exerting an expansible pressure upon said members, and a flange at each end of the bearing projecting from one of said members forming a retainer for the bushing.

8. A bearing comprising relatively-movable, concentrically-arranged metallic sleeves, and a bushing composed of a fabric impregnated with a solid lubricant arranged intermediate said sleeves and compressed therebetween, said bushing exerting an expansible pressure upon said sleeves.

In testimony whereof I affix my signature in presence of two witnesses.

NORBERT L. OBRECHT.

Witnesses:
 NEWTON SKILLMAN,
 WM. J. BELKNAP.